United States Patent
Sato

(10) Patent No.: US 7,394,829 B2
(45) Date of Patent: Jul. 1, 2008

(54) DATA MULTIPLEXING APPARATUS, DATA MULTIPLEXING METHOD, AND TRANSMISSION APPARATUS

(75) Inventor: Akihiro Sato, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 783 days.

(21) Appl. No.: 10/814,184

(22) Filed: Apr. 1, 2004

(65) Prior Publication Data

US 2004/0213298 A1    Oct. 28, 2004

(30) Foreign Application Priority Data

Apr. 11, 2003    (JP)    ............... 2003-107626

(51) Int. Cl.
  *H04H 20/28*    (2008.01)
(52) U.S. Cl.    ............... 370/486; 370/485; 370/389
(58) Field of Classification Search    ............... None
  See application file for complete search history.

(56) References Cited

U.S. PATENT DOCUMENTS 5,650,825 A * 7/1997 Naimpally et al. ........... 348/465

| | | | |
|---|---|---|---|
| 6,744,785 B2 * | 6/2004 | Robinett et al. ............. | 370/486 |
| 6,771,657 B1 * | 8/2004 | Elstermann ................. | 370/465 |
| 6,781,601 B2 * | 8/2004 | Cheung ...................... | 345/629 |
| 6,996,098 B2 * | 2/2006 | Bertram et al. ............. | 370/389 |
| 7,103,047 B1 * | 9/2006 | Wingfield ................ | 370/395.1 |
| 2002/0144260 A1 * | 10/2002 | Devara ........................ | 725/32 |
| 2002/0146023 A1 * | 10/2002 | Myers ........................ | 370/412 |

FOREIGN PATENT DOCUMENTS

| JP | 10-173622 | 6/1998 |
|---|---|---|
| JP | 11-163817 | 6/1999 |

* cited by examiner

*Primary Examiner*—Wing F. Chan
*Assistant Examiner*—Michael J Moore, Jr.
(74) *Attorney, Agent, or Firm*—Wenderoth, Lind & Ponack, L.L.P.

(57) ABSTRACT

A data multiplexing apparatus including a packet number obtainment unit for obtaining the total number of packets included in one block of a private data packet stream inputted into a channel buffer and an address obtainment unit for obtaining the address of the starting packet in each private data block. The apparatus also includes a null packet detection unit for detecting null packets when a multiplexed packet stream of data other than the private data is outputted from the channel buffer, and includes a packet replacement unit for replacing the multiplexed null packets detected by the null packet detection unit with the private data packets and outputting the multiplexed packet stream.

11 Claims, 13 Drawing Sheets

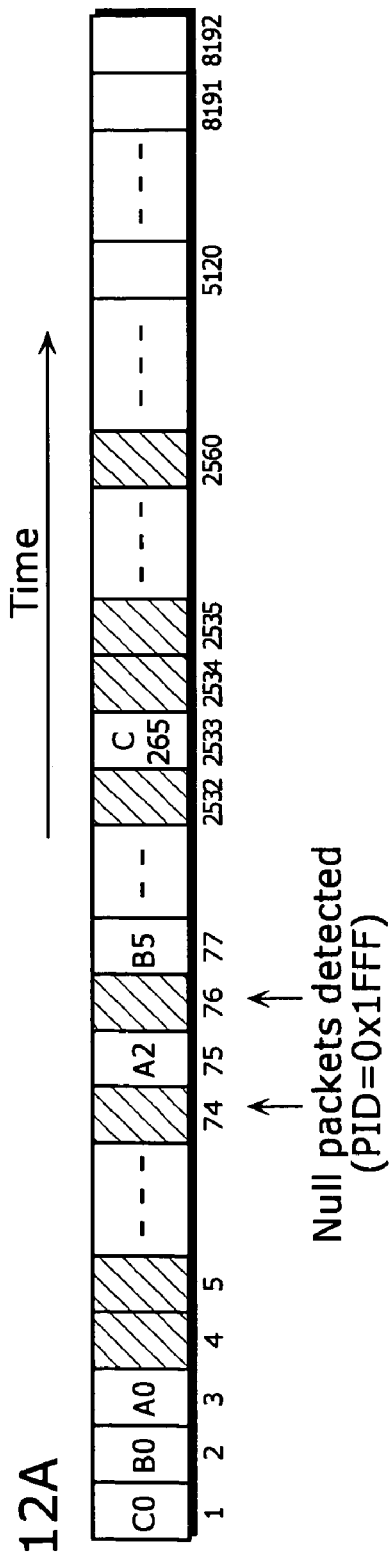
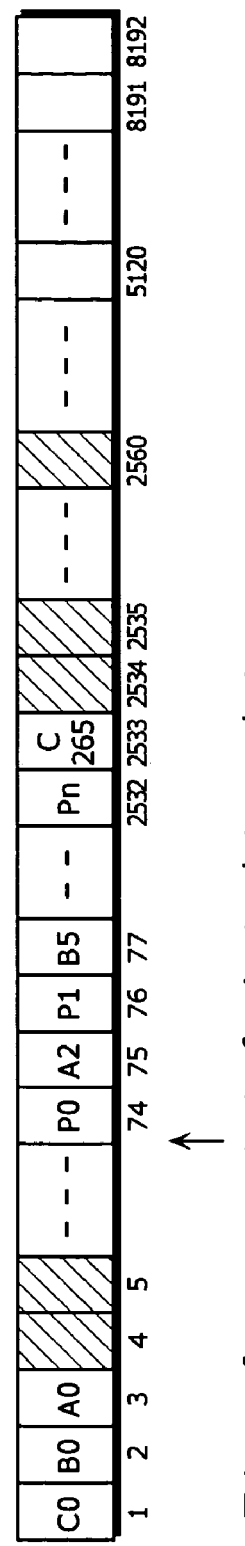
FIG. 12A
FIG. 12B

DATA MULTIPLEXING APPARATUS, DATA MULTIPLEXING METHOD, AND TRANSMISSION APPARATUS

BACKGROUND OF THE INVENTION (1) Field of the Invention

The present invention relates to a data multiplexing apparatus, a data multiplexing method and the like for multiplexing digital data such as video, audio and others for their transmission, storage and the like.

(2) Description of the Related Art

With the recent advances of digital technology, various types of services, including satellite broadcasting, CATV and video-on-demand, which are realized using digital data such as video, audio and others, have been put to practical use.

It is an important to be able to multiplex these multiple types of digital data for their transmission. As a method for multiplexing multiple types of digital data, there are Moving Picture Experts Group (MPEG) 2 Systems that follow the international standard which is jointly developed by the International Organization for Standardization and the International Electrotechnical Commission (ISO/IEC).

The MPEG2 standard includes two kinds of multiplexing systems: an MPEG2 Program Stream (PS) system suitable for storage into a storage medium or the like; and an MPEG2 Transport Stream (TS) system suitable for transmission such as broadcasting. The MPEG2-TS has a structure which allows simultaneous multiplexing of a plurality of programs into a single multiplexed stream for transmission.

The following description focuses on the conventional data multiplexing method and data multiplexing apparatus for multiplexing digital data according to the MPEG2-TS system, referring to the drawings.

FIG. 1 is a schematic diagram of the MPEG2-TS format. Digital data of video, audio and others are respectively coded and configured TS packets, each having a fixed length of 188 bytes.

The header of the TS packet includes a packet identifier (PID). One or more TS packets of video in the same program have the common PID. This is also true for the PIDs of the TS packets of audio and other digital data. In other words, one or more TS packets of audio in the same program have another common PID, and one or more TS packets of other data in the same program have still another common PID.

The header of the TS packet is followed by the data of video, audio or others, or an adaptation field. The adaptation field includes auxiliary information for multiplexing.

FIG. 2 is a diagram showing the relationship between PIDs of respective streams in a case where a plurality of programs are multiplexed simultaneously for transmission.

The PID of each stream such as a video stream and an audio stream is predetermined for each program and described in a table referred to as Program Map Table (PMT). Information on one program is described in the PMT, and a single TS includes PMTs of the number of programs.

A table in which the PIDs of the PMTs of respective programs are described is referred to as Program Association Table (PAT). A single TS includes only one PAT. The PID of the PAT is determined to be "0x0000" (a hexadecimal number).

FIG. 3 is a flowchart showing steps for reproducing a stream of video, audio and the like of a desired program from among a plurality of programs, using these PAT and PMT on the receiving end.

First, TS packets in a PAT identified by the PID of 0x0000 is detected from the inputted TS (Step S1). In the PAT, the PIDs of the PMTs of a plurality of programs are described.

After the TS packets in the PAT are detected, the PID of the PMT corresponding to the desired program is extracted from the PAT (Step S2). After the TS packets in the PMT corresponding to the desired program are extracted (Step S3), the PIDs of the streams of video, audio and the like included in the desired program are extracted from the PMT (Step S4).

Using the extracted PIDs of the streams of video, audio and the like, the TS packets with the corresponding PIDs are detected from among the received data and transmitted to respective decoders in sequence (Step S5), decoded into data of video, audio and the like, and finally reproduced as the desired program.

As described above, the MPEG2-TS standard specifies a format for allowing multiplexing of a plurality of programs into a single stream for transmission (See ISO/IEC 13818-1, "Information Technology—Generic Coding of Moving Pictures and Associated Audio: Part 1—Systems", November 1994, for example).

Next, an MPEG2-TS multiplexing apparatus will be explained with reference to the drawings.

FIG. 4 is a block diagram of a conventional data multiplexing apparatus for MPEG2-TS. As shown in FIG. 4, this data multiplexing apparatus includes a channel buffer 801, a first address control unit 802, a local CPU 803, an output buffer 804 and a second address control unit 805.

In the channel buffer 801, inputted multi-channel MPEG2-TSs (packet streams of digital data) are stored. When receiving the packet streams, the first address control unit 802 generates, for each channel, the address in the memory of the channel buffer 801, and stores the packet streams into the memory of the channel buffer 801 by channel.

The local CPU 803 determines the order of multiplexing and outputting the packets by rewriting the time-base information and PIDs for multiplexing. The first address control unit 802 reads out, from the memory of the channel buffer 801, the inputted multi-channel packets according to the multiplexing and outputting order so as to make them into a single multiplexed MPEG2-TS, and transfers them to the output buffer 804. The first address control unit 802 reads out the packets from the channel buffer 801, and further transmits, to the second address control unit 805, a data enable signal (DATAEN) indicating the enabled section of the packets read out from the channel buffer 801.

As soon as receiving the data enable signal, the second address control unit 805 generates the memory address of the output buffer 804, and stores, into the memory of the output buffer 804, the packets transferred from the channel buffer 801. While the packets are being normally inputted into the output buffer 804, the second address control unit 805 sends, to the first address control unit 802, a ready signal (READY) indicating that the output buffer 804 is in the state of being ready for storing the inputted packets.

The first address control unit 802 is notified, upon receipt of the ready signal, that the packets are being normally transferred from the channel buffer 801 to the output buffer 804.

The second address control unit 805 outputs, at a fixed rate, the packets which are multiplexed into a single MPEG2-TS stored in the memory of the output buffer 804.

Usually, a single multiplexed MPEG2-TS needs to be outputted at a transmission rate which is compliant with the standard of a transmission line (a predetermined fixed rate). However, the operating frequency in the data multiplexing apparatus is never synchronized with the transmission rate for output, so jitter of a clock needs to be absorbed for synchronization. The output buffer 804 acts as an absorber of jitter between the operating frequency in the data multiplexing apparatus and the output transmission rate.

Since the above-mentioned memory for the channel buffer for receiving multi-channel MPEG2-TSs and for the output buffer have large storage capacity, they are required to allow high-speed transfer.

In a case where a static RAM (hereinafter referred to as SRAM) is used for this memory, it has a problem of its small storage capacity although it allows high-speed transfer. On the contrary, a dynamic RAM (hereinafter referred to as DRAM) has a problem of not allowing high-speed transfer although it has large storage capacity.

On the other hand, a synchronous dynamic RAM (hereinafter referred to as SDRAM) not only has large storage capacity but also allows high-speed transfer. Therefore, SDRAMs have been used recently as memory for various devices for high-speed writing and reading.

FIG. 5 is a conceptual diagram showing the structure of an SDRAM. The operation of an SDRAM of 16 Mbits (512 kwords×16 bits×2 banks) will be explained below as one example.

This SDRAM has two banks, each having a word length of 512 Kwords and an input/output data bus of 16-bits wide. The row address is 11 bits (2,048 rows) and the column address is 8 bits (256 columns), and each bank has a word length of 512 Kwords.

In a case where the data bus is 32-bits wide, two SDRAMs of 16-bits wide are connected in parallel for use.

FIG. 6 is a timing chart of SDRAM reading. In FIG. 6, respective signals CS, RAS, CAS and WE are low active.

A clock signal (CLK) is a signal for a synchronous clock for writing and reading data into and from the SDRAM. During reading of the data from the SDRAM, a write enable signal (WE) is kept high.

For reading of the data, a chip select signal (CS) of the SDRAM is activated first.

Next, the active command is issued for designating the bank and the row address. Generally speaking, a plurality of address setting methods can be applied to an SDRAM, but particularly in a case of high-speed reading, the address setting method as shown in FIG. 6 is applied. To be more specific, in FIG. 6, after the bank and the row address is initialized, the column address is automatically incremented one by one on every clock cycle. As mentioned above, an SDRAM allows high-speed reading of column address data, which is a burst at the designated row address of the bank, continuously in synchronism with the clock. The burst length which can be read continuously is 256 words at most in a case of the column addresses of 8 bits (256 columns).

The row address is unchanged until the data of one row is completely read. This address setting method provides higher-speed reading than the method for setting the row and column addresses at random.

After activating the chip select signal (CS), the bank and row addresses are set. The bank and the row addresses are set in the address signal (ADD [11:0]) at the same time, the row address strobe signal (RAS) is activated, and then the bank and the row address are taken into the SDRAM. Next, the column address data is set in the address signal (ADD [11:0]), the column address strobe signal (CAS) is activated, and then the default values of the column addresses are taken into the SDRAM. Since there are only 256 columns as column addresses, the higher-order 4 bits are ignored.

The column address strobe signal (CAS) is maintained active during reading of data from the SDRAM. During the column address strobe signal (CAS) being active, the column address is incremented one by one on every clock cycle (in synchronism with the clock).

Under the address control as mentioned above, the data stored in the address designated by the bank, row address and column address is outputted from the data signal (DATA [31:0]) of the SDRAM.

However, the data is not outputted immediately after the column address is set, but outputted after a lapse of CAS latency. The CAS latency is usually 2 or 3 clock cycles. To be more specific, in a case where data is read out from an SDRAM, 4 clock cycles or so are required for a period of time from activation of a chip select signal (CS) up to output of the first data, because of the necessity to set an active command, and set a column address and CAS latency.

When the data of one row is completely read and the following row is read, it is necessary to reissue the active command for designating the bank and row address so as to repeat the above-mentioned processes.

FIG. 7 is a timing chart of SDRAM writing. In FIG. 7, respective signals CS, RAS, CAS and WE are low active.

A clock (CLK) signal is a signal for a synchronous clock for writing and reading data into and from the SDRAM.

For writing of the data, a chip select signal (CS) of the SDRAM is activated first.

Next, the active command is issued for designating the bank and row address. Generally speaking, a plurality of address setting methods can be applied to an SDRAM, but particularly in a case of high-speed writing, the address setting method as shown in FIG. 7 is applied. To be more specific, in FIG. 7, after the bank and the row address is initialized, the column address is automatically incremented one by one on every clock cycle. As mentioned above, an SDRAM allows high-speed writing of column address data, which is a burst at the designated row address of the bank, continuously in synchronism with the clock. The burst length which can be written continuously is 256 words at most in a case of the column addresses of 8 bits (256 columns).

The row address is maintained unchanged until the data of one row is completely written. This address setting method provides higher-speed writing than the method for setting the row and column addresses at random.

After activating the chip select signal (CS), the bank and row addresses are set. The bank and the row addresses are set in the address signal (ADD [11:0]) at the same time, the row address strobe signal (RAS) is activated, and then the bank and the row address are taken into the SDRAM. Next, the column address data is set in the address signal (ADD [11:0]), the column address strobe signal (CAS) is activated, and then the default values of the column addresses are taken into the SDRAM. Since there are only 256 columns as column addresses, the higher-order 4 bits are ignored.

The column address strobe signal (CAS) is maintained active during writing of data into the SDRAM. During the column address strobe signal (CAS) being active, the column address is incremented one by one on every clock cycle (in synchronism with the clock).

Simultaneously with activating of the column address strobe signal (CAS), the write enable signal (WE) is activated.

Under the address control as mentioned above, the data to be inputted into the data signal (DATA [31:0]) of the SDRAM is written into the address designated by the bank the row address, and the column address.

Different from reading, in a case of writing, the data is written simultaneously with the setting of the column address, regardless of CAS latency. To be more specific, in a case where the data is written into the SDRAM, 2 clock cycles are required for a period of time from activation of the chip select signal (CS) up to writing of the first data, because of the necessity to set the active command and set the column address.

When the data is written into the following row after the data of one row is completely written, it is necessary to reissue the active command for designating the bank and row addresses so as to repeat the above-mentioned processes.

Explanation will be back to FIG. 4.

The local CPU 803 usually determines the order of multiplexing in every predetermined time period (T). It is assumed here that multiplexing processing is performed in every T=100 ms. The packet streams which are multiplexed into a single MPEG2-TS are outputted at a transmission rate which is compliant with the standard of the transmission line (a predetermined fixed rate). It is assumed here that the output transmission rate is 38.1 Mbps and the operating frequency in the data multiplexing apparatus is 30 MHz.

When performing multiplexing processing at every 100 ms, the local CPU 803 rewrites the time-base information and the PIDs. At that time, the packet streams stored in the memory of the channel buffer 801 are read and written by the local CPU 803. Therefore, for 100 ms the packet streams, which are multiplexed by the local CPU 803, need to be previously stored in the channel buffer 801.

In other words, delay of at least 100 ms occurs during a time period from inputting of the packet streams into the channel buffer 801 until multiplexing processing thereof is performed by the local CPU 803.

The second address control unit 805 outputs, at a fixed rate (38.1 Mbps), a single multiplexed MPEG2-TS stored in the memory of the output buffer 804. Since the output rate compliant with the standard of this transmission line is not synchronized with the operating frequency (30 MHz) in the data multiplexing apparatus, the output buffer 804 is required for absorbing jitter of a clock.

Since the local CPU 803 performs multiplexing processing at the rate of 100 ms, the packets for at least 100 ms need to be stored in the output buffer 804 in order to avoid underflow or overflow of the output buffer 804. Usually, the output buffer 804 is controlled so as to store packets for 100 ms+α to 200 ms+α.

In other words, delay of more than 100 to 200 ms occurs in the output buffer 804.

As mentioned above, the delay of the packets in the data multiplexing apparatus is around 200 to 300 ms in total, namely, 100 ms for multiplexing processing in the local CPU 803 and 100 to 200 ms in the output buffer 804.

As described above, the conventional data multiplexing apparatus uses a channel buffer for data input and data multiplexing and further uses an output buffer for outputting a single multiplexed packet stream at a transmission rate compliant with the standard of the transmission line, so the delay of the packets in the data multiplexing apparatus is 300 ms or so.

Since there is no particular problem in a case of on-demand viewing of a video signal and an audio signal because delay of 300 ms or so occurs only when the viewing starts.

However, since the conventional data multiplexing apparatus also performs the data multiplexing processing on a private data signal as well as video and audio signals, delay of 300 ms occurs every time it transmits or receives the data.

Particularly in a case where private data is distributed by storing, into the private data signal, IP packets including the Internet information for interactive access to each page, it becomes a problem if delay of 300 ms occurs on every transmission or reception of data (i.e., on every interaction of a user). In other words, this type of delay may cause time consumption of dozens of seconds for displaying the user-requested page on the Internet. Therefore, it is preferable to restrain the delay of the private data signal in the data multiplexing apparatus within dozens of ms.

SUMMARY OF THE INVENTION

The present invention has been made in view of the above-mentioned circumstances, and the object of the present invention is to provide a data multiplexing apparatus, a data multiplexing method and the like for restraining delay of a packet stream of a private data signal in the data multiplexing apparatus when generating a multiplexed packet stream for output by multiplexing inputted multi-channel packet streams.

In order to achieve the above object, the data multiplexing apparatus according to the present invention is a data multiplexing apparatus for multiplexing a plurality of packet streams and outputting a multiplexed packet stream. The data multiplexing apparatus includes a data multiplexing unit operable to generate a first multiplexed packet stream by multiplexing at least one first packet stream and null packets so that the multiplexed packet stream is outputted at a predetermined transmission rate, said null packets being inserted into said first multiplexed packet stream, and includes a packet replacement unit operable to generate the multiplexed packet stream by replacing the inserted null packets with packets that constitute a second packet stream.

Here, the above-mentioned data multiplexing apparatus may further include a packet stream storage unit having an area for storing a second packet stream. The packet replacement unit includes an address obtainment subunit operable to obtain an address indicating where a packet is stored in the packet stream storage unit, said packet being a starting packet in each predetermined block of packets on the second packet stream stored in the packet stream storage unit, includes a null packet detection subunit operable to detect the null packets in the first multiplexed packet stream generated by the data multiplexing unit, and includes a packet replacement subunit operable to generate the multiplexed packet stream by replacing the null packets detected by the null packet detection subunit with packets starting from the packet indicated by the address obtained by the address obtainment subunit.

In addition, the above-mentioned packet replacement unit may further include a packet number obtainment subunit operable to obtain the number of packets included in said each predetermined block on the second packet stream stored in the packet stream storage unit. Further, the packet replacement subunit may generate the multiplexed packet stream by replacing the null packets with said packets in sequence starting from the packet indicated by the address, the number of said packets being equivalent to the number obtained by the packet number obtainment subunit.

Accordingly, it is possible to restrain the delay of the second packet stream more than the case where the second packet stream is multiplexed by the same method for multiplexing the first packet stream.

For example, as for the private data packet stream, the time-base information and the like do not need to be rewritten for multiplexing, differently from the packet stream of a video signal or an audio signal. In addition, since the time-base information is not necessary, the private data packets may be multiplexed anywhere in a single multiplexed packet stream.

Differently from the video and audio packets, the null packets are inserted into the single multiplexed packet stream just for keeping the transmission rate, so they are removed from the stream when the video and audio packets are decoded for viewing on the receiving end. In other words, it is possible to replace the null packets with the private data packets for output.

Accordingly, assuming that the first packet stream is a packet stream including a video or audio signal and the second packet stream is a packet stream of private data, it is possible to solve the delay because the time required for multiplexing a video or audio signal is not required for multiplexing private data.

In addition, the present invention can be realized not only as the above-mentioned data multiplexing apparatus, but also as a transmission apparatus including this data multiplexing apparatus, as a data multiplexing method including the steps executed by the characteristic units included in the data multiplexing apparatus, or as a program causing a computer to execute those steps. Needless to say, it is possible to distribute such a program via a recording medium like a CD-ROM or a transmission medium like the Internet.

As described above, according to the data multiplexing apparatus and the data multiplexing method of the present invention, it is possible to restrain the delay of the second packet stream, rather than the first packet stream.

As further information about technical background to this application, Japanese Patent Application No. 2003-107626 filed on Apr. 11, 2003 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 12A is a conceptual diagram showing a multiplexed packet stream before replacement of packets;

FIG. 12B is a conceptual diagram showing a multiplexed packet stream after replacement of packets.

DETAILED DESCRIPTION OF THE INVENTION

The embodiments of the present invention will be explained below in detail with reference to the drawings.

First Embodiment

Figure 1:
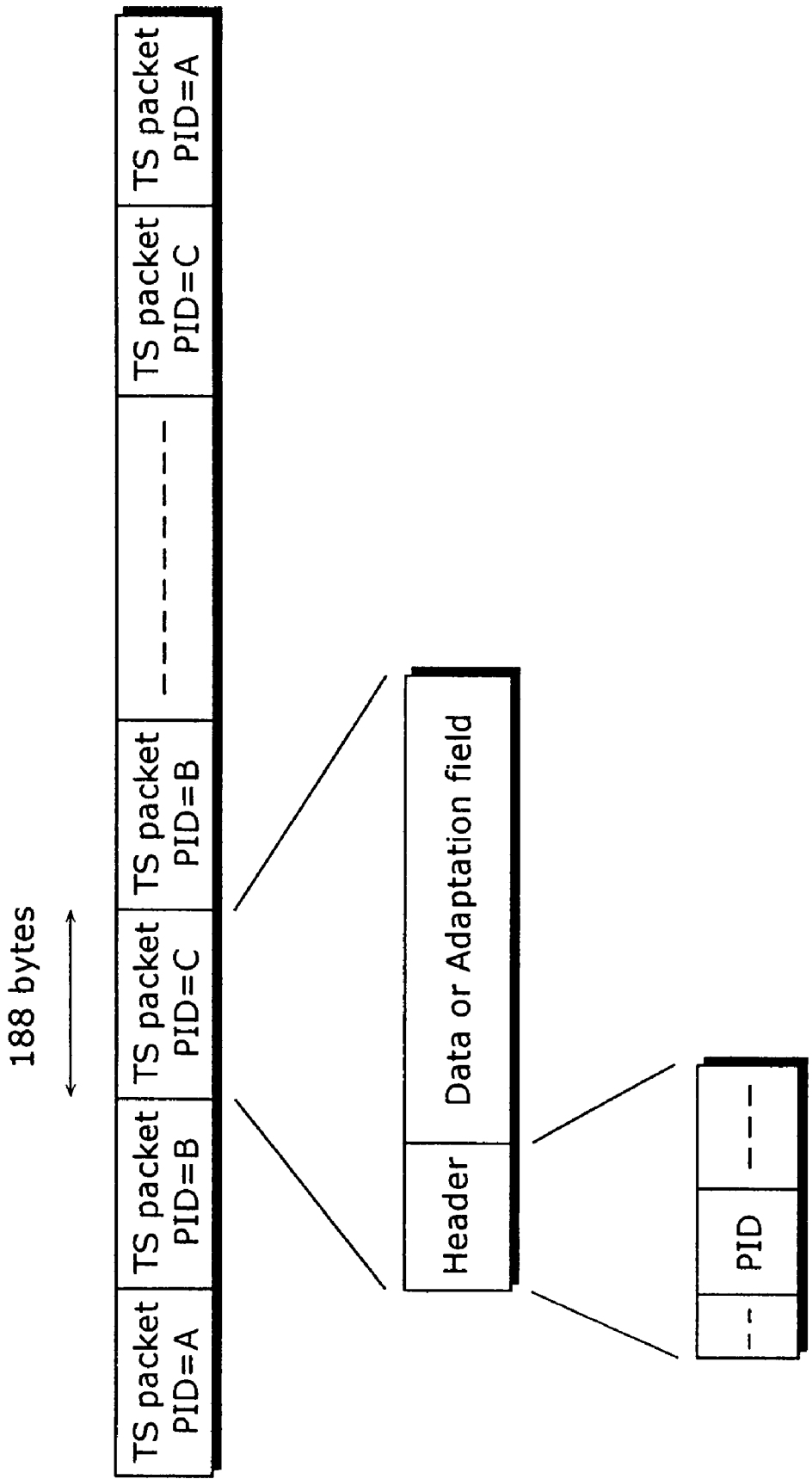
FIG. 1 is a schematic diagram of an MPEG2-TS format.
Figure 2:
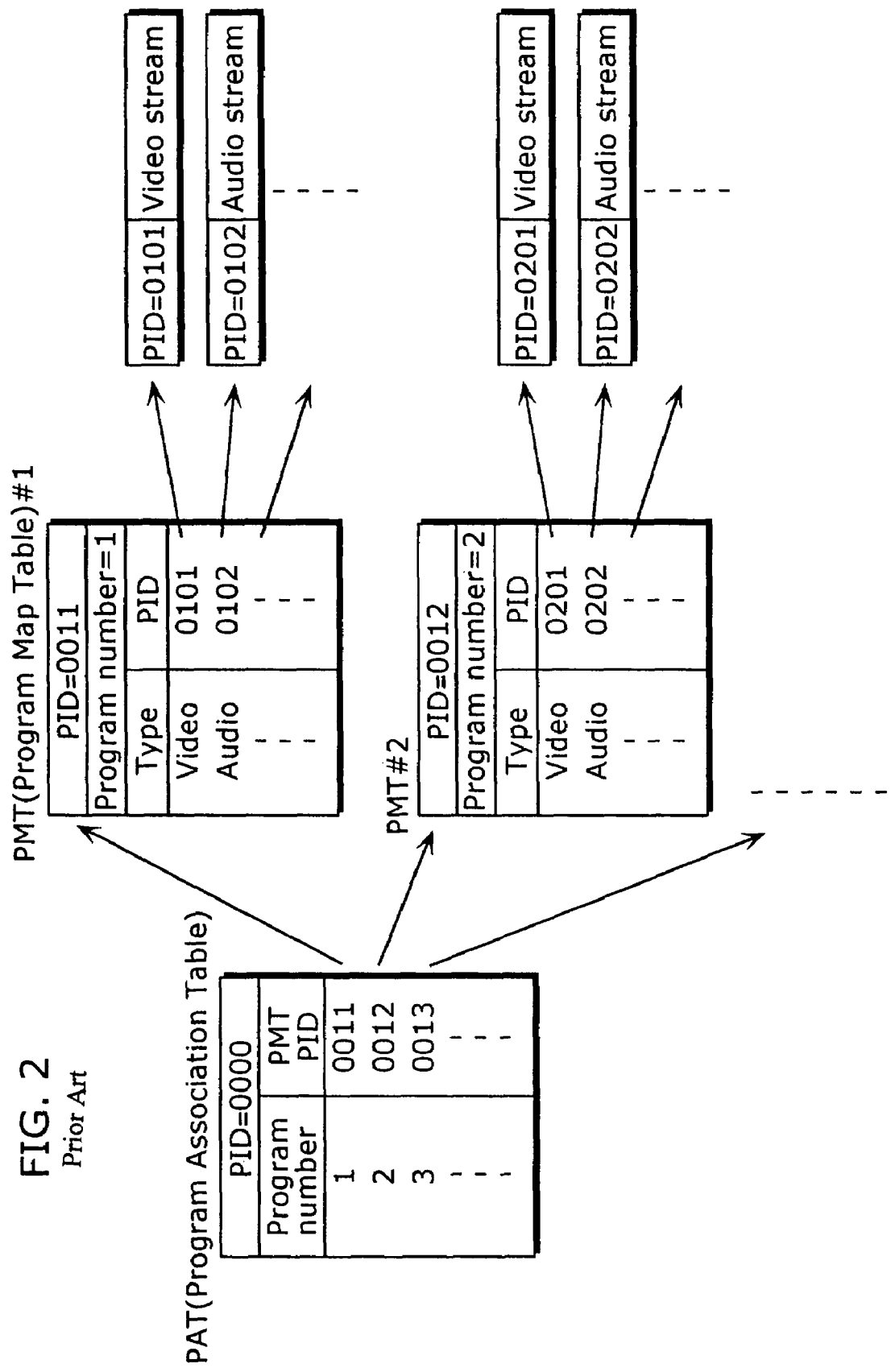
FIG. 2 is a diagram showing the relationship between PIDs of respective packet streams of a plurality of programs which are multiplexed simultaneously into a stream.
Figure 3:
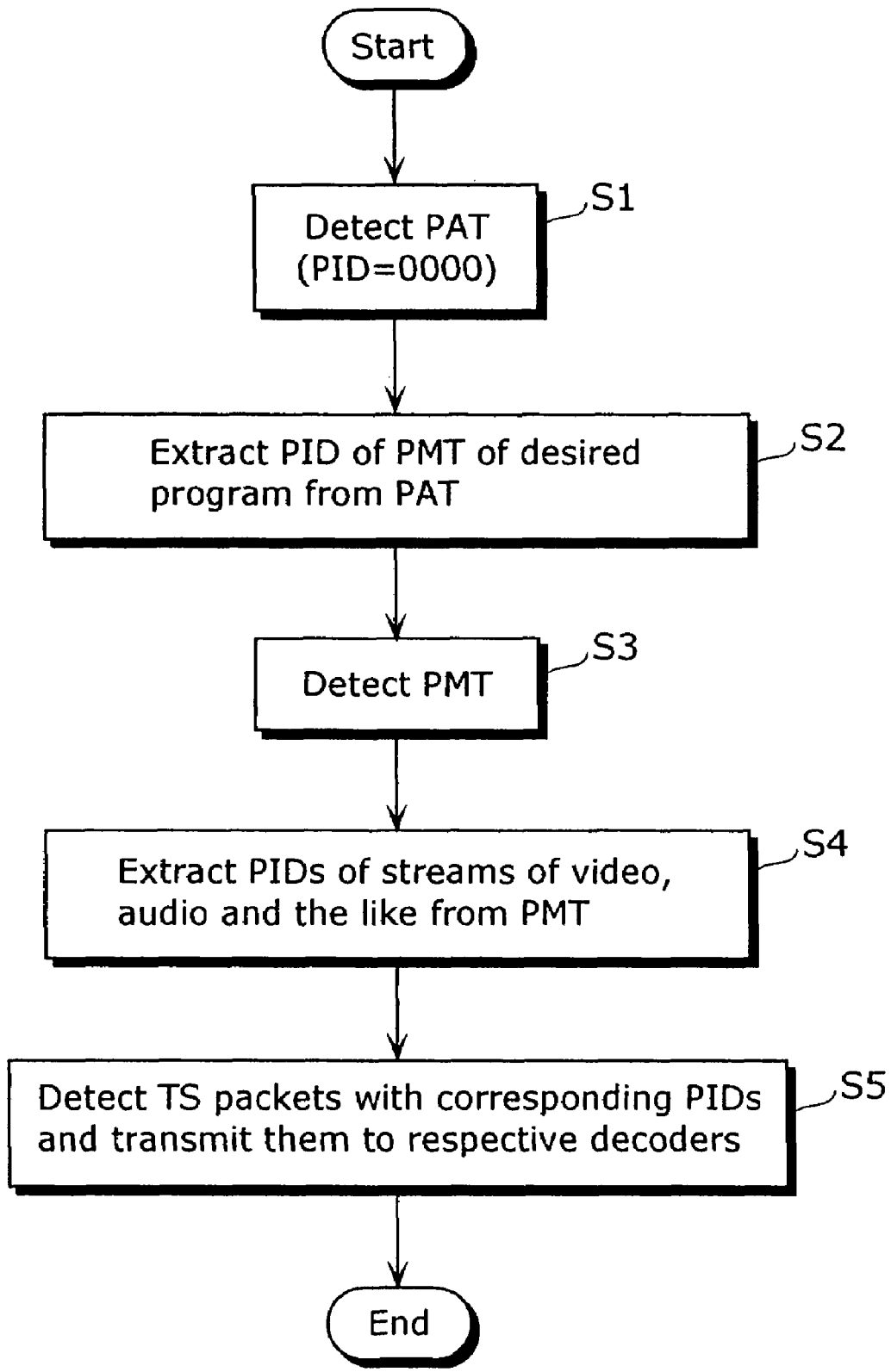
FIG. 3 is a flowchart showing steps of reproducing a stream of video, audio and the like of a favorite program from among a plurality of programs.
Figure 4:
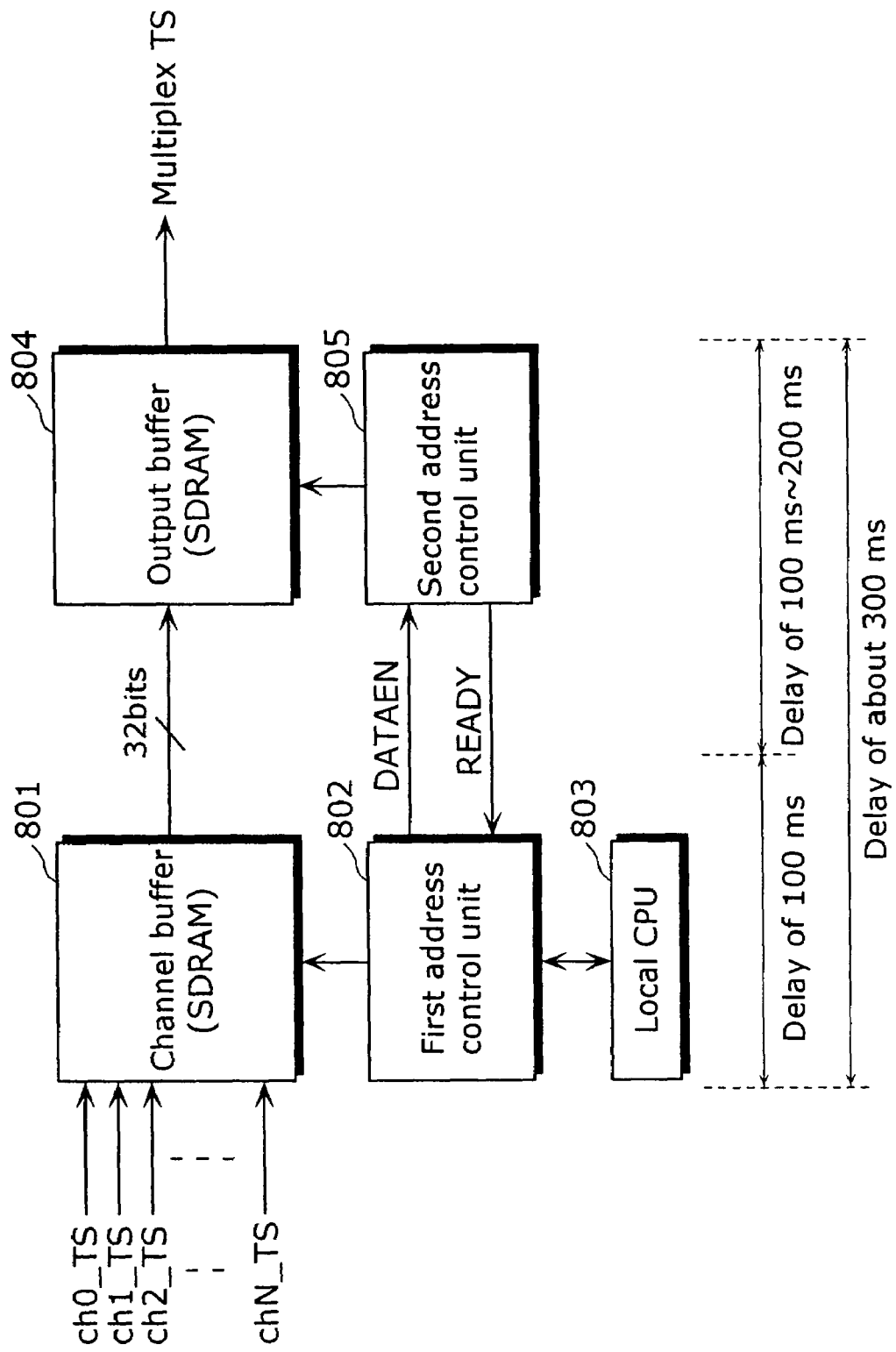
FIG. 4 is a block diagram of a conventional data multiplexing apparatus for MPEG2-TS.
Figure 5:
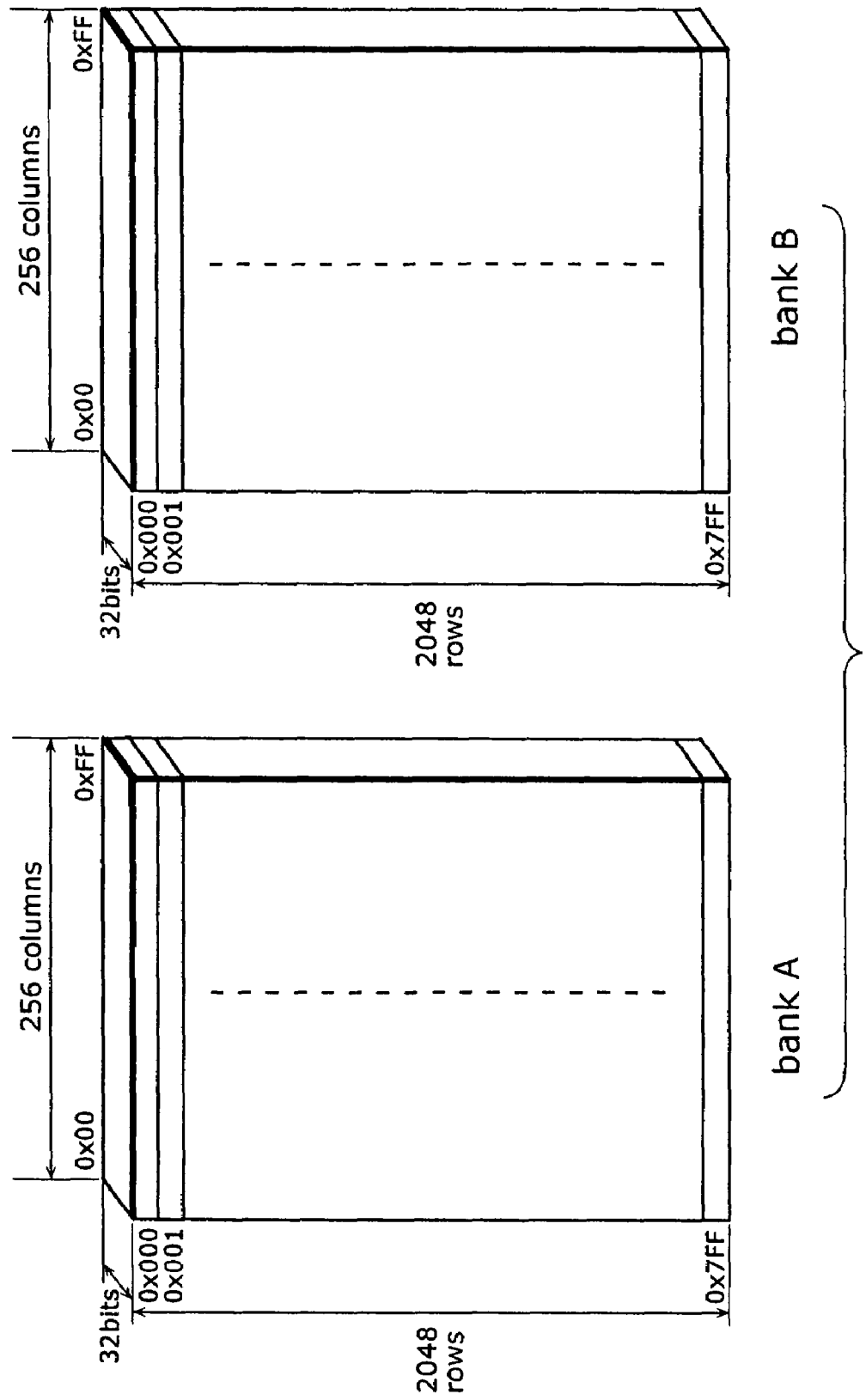
FIG. 5 is a conceptual diagram showing a structure of SDRAM.
Figure 6:
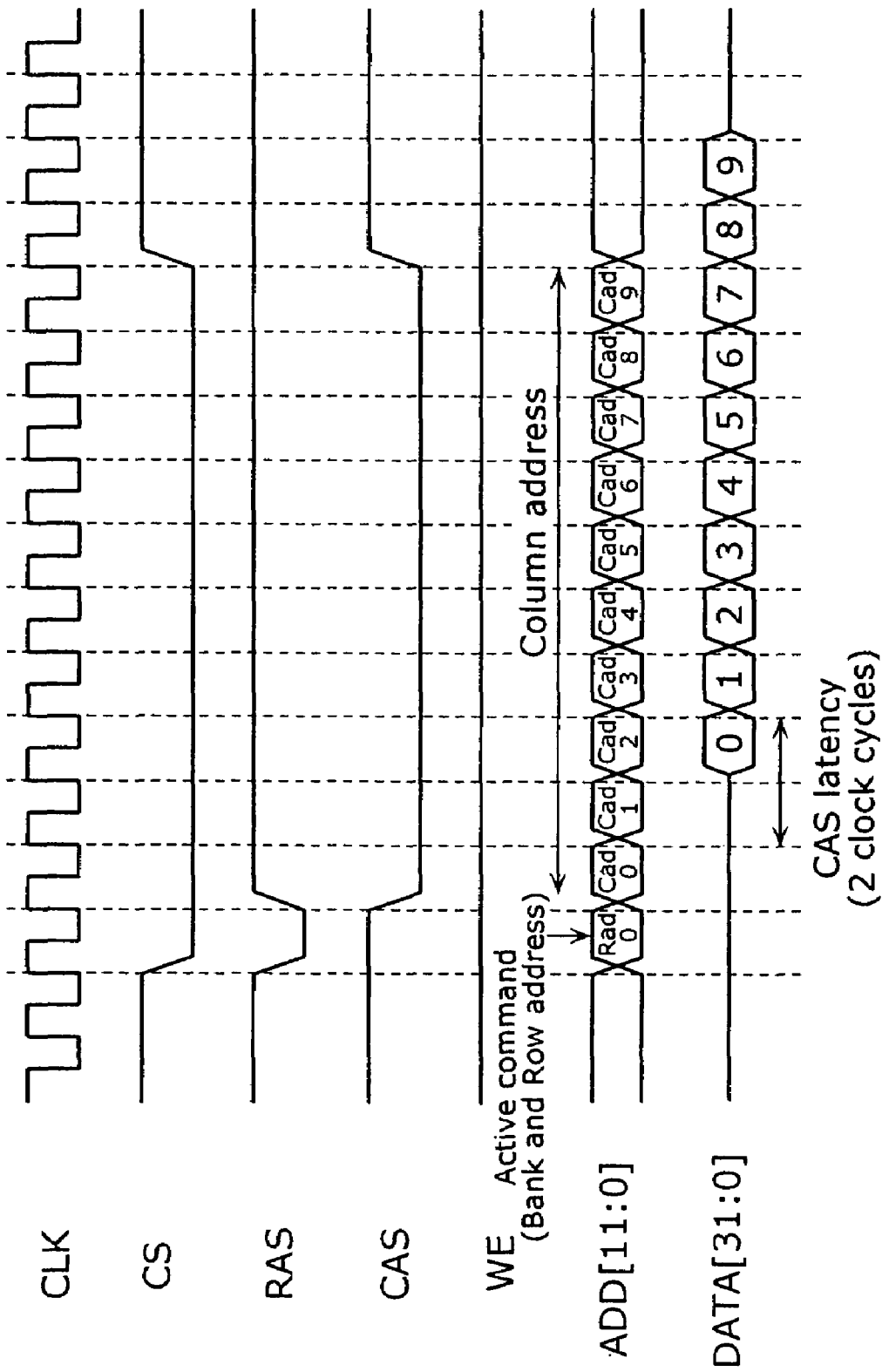
FIG. 6 is a timing chart of SDRAM reading.
Figure 7:
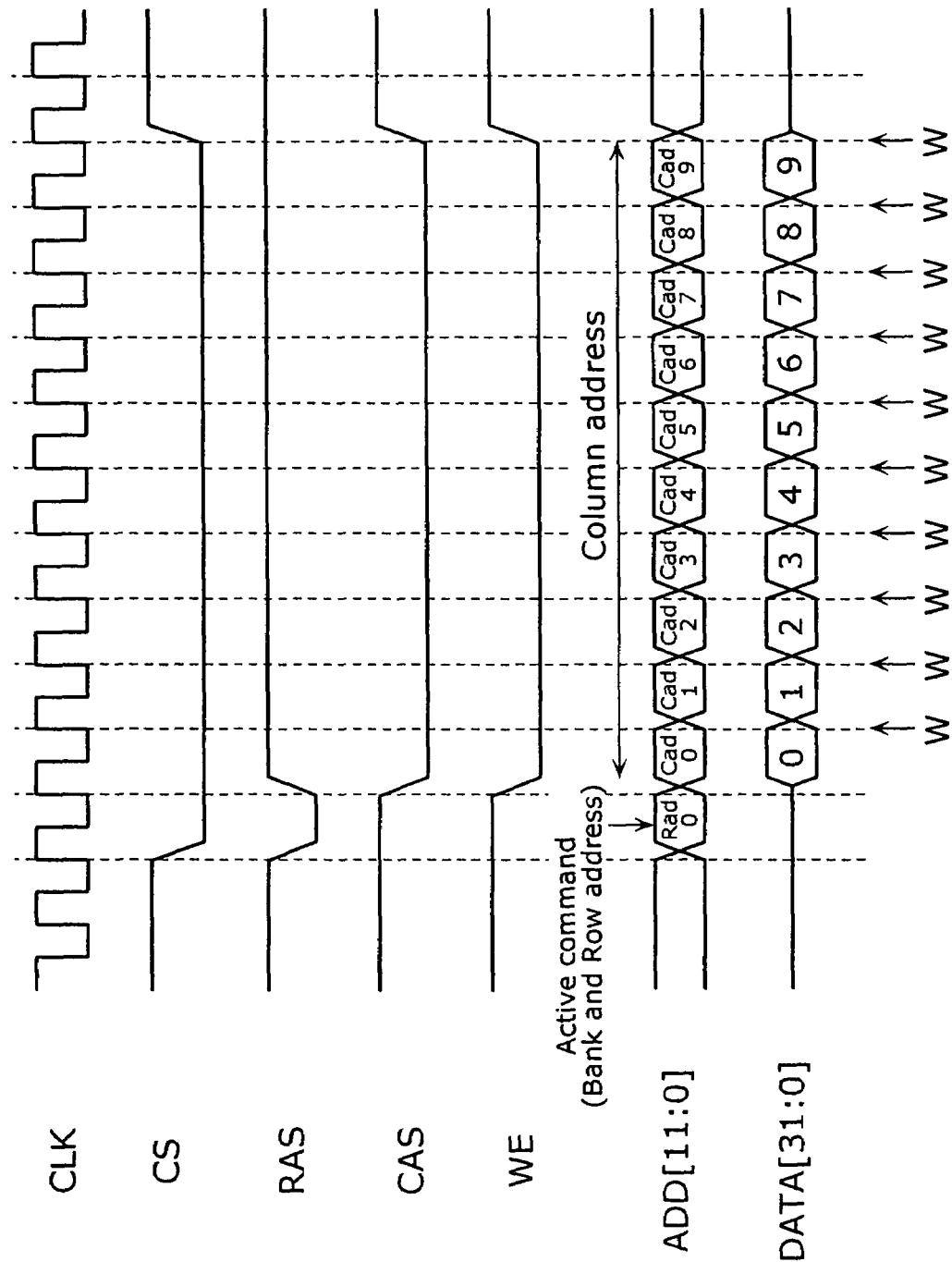
FIG. 7 is a timing chart of SDRAM writing.
Figure 8:
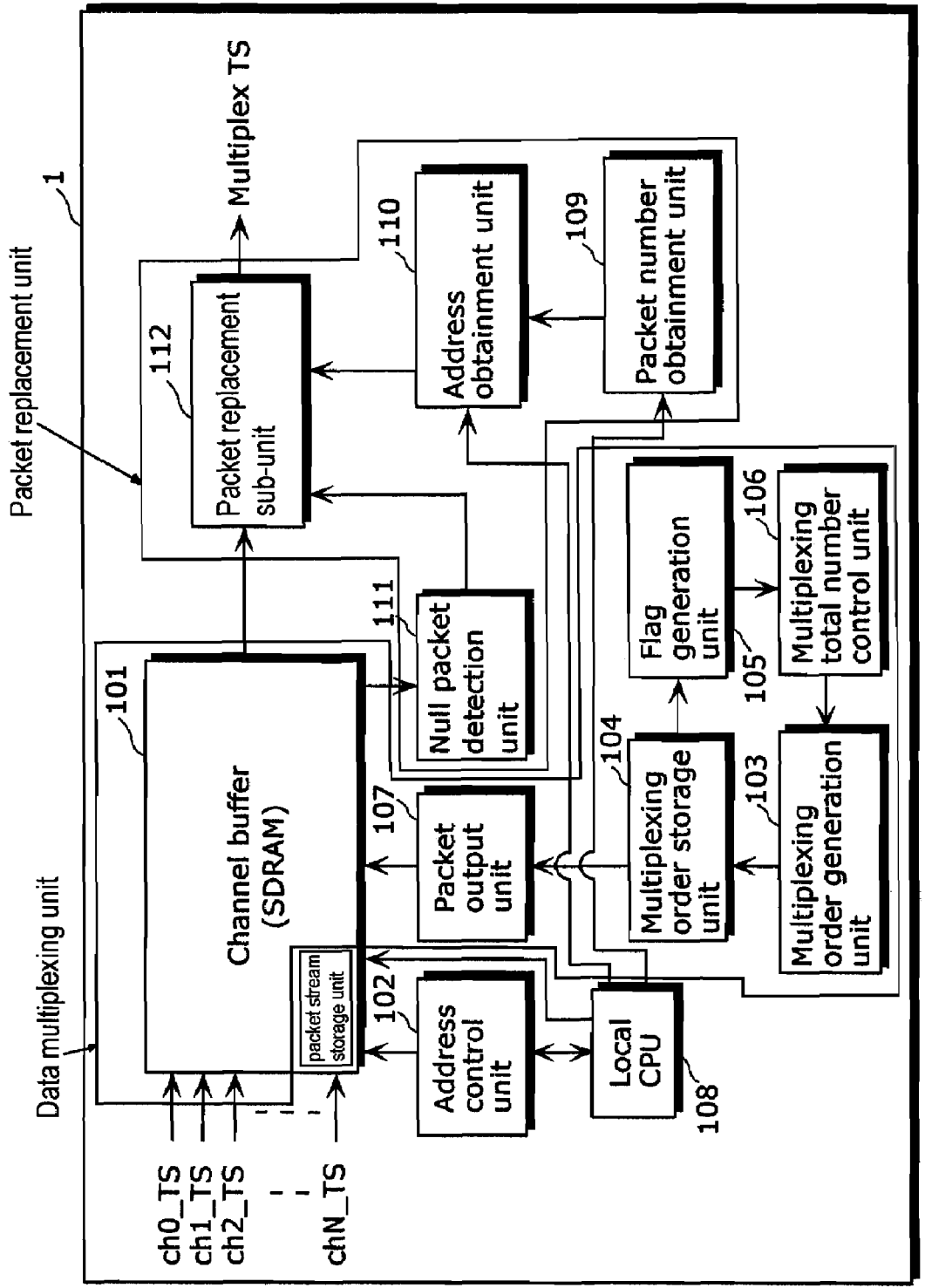
FIG. 8 is a block diagram showing a structure of a data multiplexing apparatus according to a first embodiment of the present invention.

FIG. 8 is a block diagram showing a structure of a data multiplexing apparatus 1 according to the first embodiment of the present invention.

The data multiplexing apparatus 1 in the present embodiment receives MPEG2-TSs (packet streams) of multiple channels and outputs a single multiplexed MPEG2-TS. As shown in FIG. 8, the data multiplexing apparatus 1 includes an address control unit 102 and a local CPU 108. Further, the data multiplexing apparatus 1 includes a data multiplexing unit including a channel buffer 101, a multiplexing order generation unit 103, a multiplexing order storage unit 104, a flag generation unit 105, a multiplexing total number control unit 106, and a packet output unit 107. In addition the data multiplexing apparatus 1 includes a packet replacement unit including a packet number obtainment unit 109, an address obtainment unit 110, a null packet detection unit 111 and a packet replacements subunit 112.

In the present embodiment, the channel buffer 101 includes a packet stream storage unit.

The channel buffer 101 receives inputted multi-channel MPEG2-TSs (packet streams of digital data) and stores them on each channel. In the present embodiment, the channel buffer 101 is comprised of an SDRAM which has large storage capacity and allows high-speed transfer.

Generally speaking, a DRAM such as an SDRAM requires more time than an SRAM for address setting for input or output of digital data, but have a dramatic effect on the data multiplexing apparatus or the data multiplexing method of the present invention particularly because such data multiplexing apparatus or data multiplexing method requires a high-speed and large capacity memory for multiplexing multi-channel data, as mentioned above. However, the application of the present invention is not limited to the data multiplexing apparatus which uses an SDRAM or a DRAM, but it can be applied to the data multiplexing apparatus which uses any type of memory.

In addition, since the present invention does not challenge the delay of the memory itself, it can be applied to the data multiplexing apparatus, the data multiplexing method or the like which uses an arbitrary memory.

The multiplexing order generation unit 103 generates the multiplexing order of packets for generating a single multiplexed packet stream by multiplexing the packet streams of other data than private data in the inputted multi-channel packet streams, according to the transmission rate of each channel. Generation of the multiplexing order according to the transmission rate means the following processing, for example. First, the multiplexing order generation unit 103 determines the number of packets to be sent out during a unit time period required for securing the transmission rate, and then schedules a plurality of packets so as to send out the packets of the determined number regularly. Instead, the multiplexing order generation unit 103 may generate the multiplexing order of packets depending on the transmission rate, according to another algorithm.

The multiplexing processing is usually performed in every predetermined time period (T). In the present embodiment, it is assumed that the multiplexing processing is performed in every T=100 ms. It is also assumed here that a single multiplexed MPEG2-TS is outputted at a transmission rate which is compliant with the standard of the transmission line (a predetermined fixed rate). In the present embodiment, the output transmission rate shall be 38.1 Mbps.

In addition, the operating frequency in the data multiplexing apparatus 1 shall be 30 MHz. The multiplexing order generation unit 103 generates the multiplexing order in synchronism with the clock of 30 MHz.

The multiplexing order storage unit 104 stores the multiplexing order of the packets generated by the multiplexing order generation unit 103. The multiplexing order storage unit 104 is comprised of a software and/or a hardware for accumulating packets and a memory. When storing the generated multiplexing order of the multi-channel MPEG2-TS packets to be stored into the channel buffer 101, the multiplexing order storage unit 104 does not store all the MPEG2-TS packets (each of which is 188 bytes) but stores only the starting address (32 bits) of each packet stored in the channel buffer 101. Thereby, the capacity of a memory can be reduced. The above mention of "storing the multiplexing order of packets" means storing the starting address (32 bits) of each multi-channel MPEG2-TS packet in the multiplexing order.

The memory of the multiplexing order storage unit 104 must have a certain amount of capacity. Since the multiplexing processing is performed in every T=100 ms in the present embodiment, the memory must store the multiplexing order of the packets for 100 ms at minimum. Since the output transmission rate is 38.1 Mbps, the data amount for 100 ms is 3.81 Mbit (476250 bytes). The number of packets for 100 ms is about 2534 because the length of one MPEG2-TS packet is 188 bytes.

However, the memory capacity for 100 ms (i.e., 2534 packets) of the multiplexing order storage unit 104 causes overflow or underflow thereof because the operating clock 30 MHz of the data multiplexing apparatus is asynchronous to the output transmission rate 38.1 Mbps, and thus causes the crash of multiplexing processing.

So, it is preferable to exert buffer control on the memory of the multiplexing order storage unit 104 between 100 ms+α and 200 ms+α. Namely, the memory capacity of the multiplexing order storage unit 104 requires that for 300 ms or so. In the present embodiment, the memory capacity shall be that for 8192 packets (about 323 ms). Namely, the total memory capacity is 256 Kbits because the capacity required for one packet is 32 bits. Note that this memory may be realized by any type of memory such as SDRAM, DRAM and SRAM.

Figure 9A:
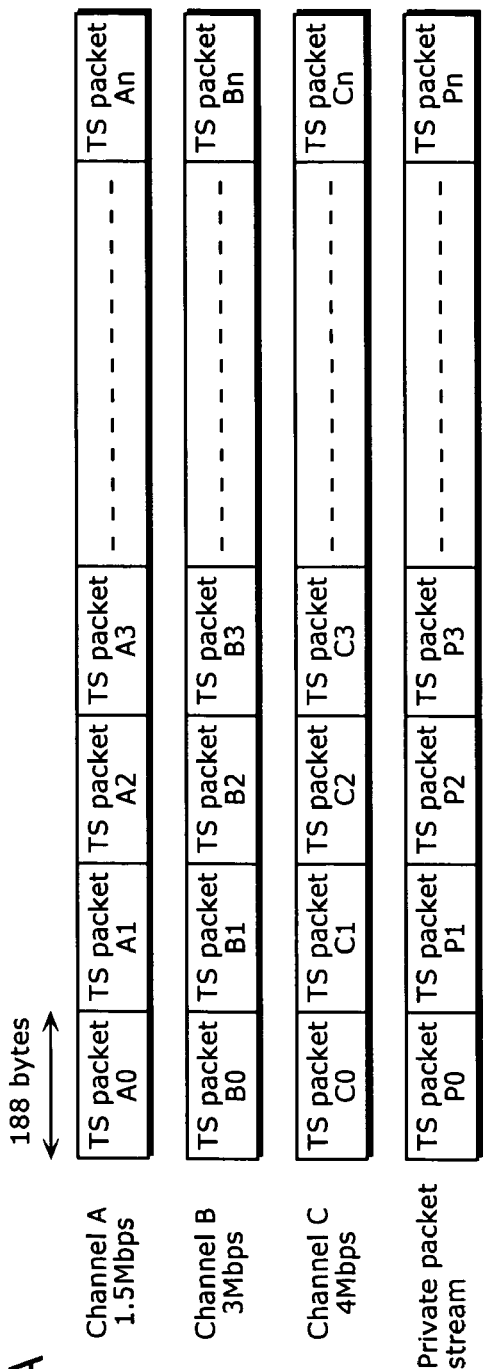
FIG. 9A is a conceptual diagram showing one example of packet streams to be inputted into the data multiplexing apparatus 1 in the present embodiment.
Figure 9B:
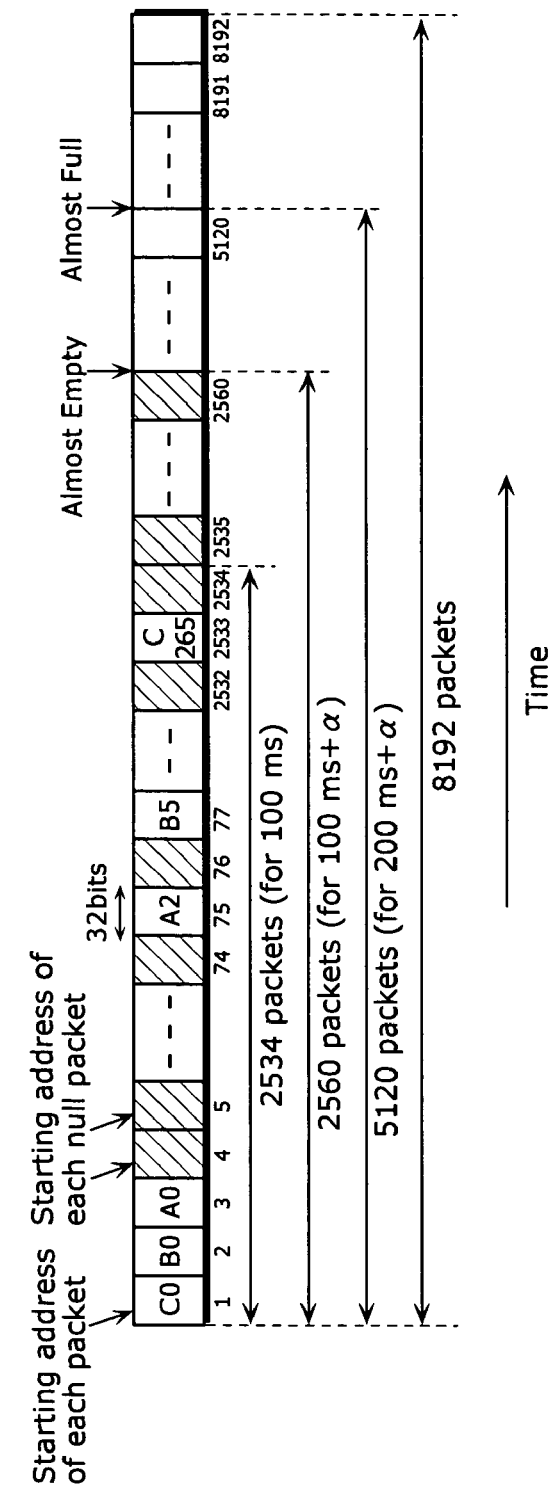
FIG. 9B is a conceptual diagram showing the state how data is stored in a multiplexing order storage unit 104.

FIG. 9A is a conceptual diagram showing one example of packet streams to be inputted into the data multiplexing apparatus 1 in the present embodiment, and FIG. 9B is a conceptual diagram showing the state how the packets are stored in the multiplexing order storage unit 104.

In the present embodiment, the processing for multiplexing packet streams will be explained by taking the case where data of 4 channels is inputted into the data multiplexing apparatus 1 as an example. As shown in FIG. 9A, as for these data of 4 channels, a channel A is audio and video data of 1.5 Mbps, a channel B is audio and video data of 3 Mbps, a channel C is audio and video data of 4 Mbps, and one more channel is private data.

In this case, the data multiplexing apparatus 1 multiplexes the packet streams in the channels A, B and C.

The multiplexing order storage unit 104 can store the starting addresses (each of which is 32 bits) of 8192 packets, as mentioned above.

The total number of packets to be multiplexed in each multiplexing unit time T=100 ms is about 2534 packets at the transmission rate of 38.1 Mbps. One hundred packets are multiplexed in 100 ms via the channel A of 1.5 Mbps, 200 packets are multiplexed in 100 ms via the channel B of 3 Mbps, 266 packets are multiplexed in 100 ms via the channel C of 4 Mbps. Since 2534 packets are usually multiplexed in 100 ms, null packets are multiplexed for the remaining 1968 packets so that 2534 packets in total are multiplexed.

These packets are multiplexed and placed in a stream so that the packets of each channel appear at regular intervals. Since there exist 100 packets of the channel A among these 2534 packets, they appear once every 25 packets or so in the multiplexing order storage unit 104. Similarly, the packets of the channel B appear once every 13 packets or so, and the packets of the channel C appear once every 10 packets or so. In other positions, the null packets are multiplexed and placed. Note that the packets of the above-mentioned channels do not always need to be multiplexed and placed in a stream so that they appear at regular intervals, but may be multiplexed and placed in another way.

The explanation of FIG. 8 will continue as follows.

The flag generation unit 105 generates flags indicating the state how the packets are stored in the multiplexing order storage unit 104. As described above, it is preferable to exert buffer control on the memory of the multiplexing order storage unit 104 between 100 ms+α and 200 ms+α. Therefore, in the present embodiment, an almost empty flag is set in the position of 100 ms+α, and an almost full flag is set in the position of 200 ms+α, as shown in FIG. 9B. In other words, since about 2534 packets are multiplexed in 100 ms, the almost empty flag is set at the position for 2560th packet, and the almost full flag is set in the position for 5120th packet. The almost empty flag and the almost full flag indicate the state of how the packets are stored. To be more specific, the almost empty flag indicates that there is enough free space in the buffer, whereas the almost full flag indicates that the space in the buffer is small.

The multiplexing total number control unit 106 controls the total number of packets to be multiplexed at a predetermined time unit (T=100 ms) using flags generated by the flag generation unit 105 indicating the state of how the packets are stored.

Since about 2534 packets are outputted in 100 ms in the present embodiment, the total number of packets to be multiplexed in 100 ms is also 2534. However, as mentioned above, if a packet stream of 2534 packets are generated each time, the memory of the multiplexing order storage unit 104 comes into overflow or underflow in the meantime because the operating clock 30 MHz of the data multiplexing apparatus is asynchronous to the output transmission rate 38.1 Mbps, and thus the multiplexing processing crashes.

So, the buffer control is implemented using the almost empty flag and the almost full flag generated by the flag generation unit 105. The multiplexing total number control unit 106 determines the total number of packets to be multiplexed in 100 ms. When determining the total number, the multiplexing total number control unit 106 refers to the flags generated by the flag generation unit 105, and if the almost empty flag is enabled, it increases the total number of packets in the previous 100 ms by a predetermined number thereof so as to determine the increased total number as the total number of packets in the next 100 ms. If the almost full flag is enabled, it decreases the total number of packets in the previous 100 ms by a predetermined number thereof so as to determine the decreased total number as the total number of packets in the next 100 ms.

For example, when the total number of packets in the previous 100 ms is 2534 and the almost empty flag is enabled, the multiplexing total number control unit 106 determines the total number of packets in the next 100 ms to be 2535 by adding one packet.

On the contrary, when the total number of packets in the previous 100 ms is 2534 and the almost full flag is enabled, the multiplexing total number control unit 106 determines the total number of packets in the next 100 ms to be 2533 by subtracting one packet.

As described above, the multiplexing order generation unit 103 generates the multiplexing order of the packets in the next 100 ms according to the total number of packets in the next 100 ms determined by the multiplexing total number control unit 106. The above-mentioned algorithm for determining the total number of packets is just one example, any other algorithms for determining the total number of packets may be used in order to avoid memory overflow or underflow.

The packet output unit 107 outputs a single multiplexed packet stream stored in the multiplexing order storage unit 104 at a transmission rate which is compliant with the standard of the transmission line (a fixed rate=38.1 Mbps). In the multiplexing order storage unit 104, the starting addresses (32 bits per address) of the MPEG2-TS packets (188 bytes per packet) are stored. The packet output unit 107 retrieves the packets in the channel buffer 101 in sequence according to these addresses and outputs them to the transmission line at the transmission rate of 38.1 Mbps.

The local CPU 108 rewrites time-base information and PIDs for multiplexing in the memory of the channel buffer 11.

The address control unit 102 provides address control over the channel buffer 101. In order to input data into the data multiplexing apparatus, the channel buffer 101 needs to have enough free space for the inputted data because the new data is overwritten on the previously inputted data if there is no space. Namely, the data must be inputted into the data multiplexing apparatus under the control of the free space in the channel buffer 101 for each channel.

In other words, the multi-channel data cannot be inputted into the data multiplexing apparatus 1 at a fixed transmission rate (i.e., in asynchronous mode). That is why the channel buffer 101 does not have enough free space the next data cannot be inputted unless the data stored in the channel buffer 101 is outputted from the data multiplexing apparatus 1 after multiplexing.

Therefore, the data multiplexing apparatus 1 in the present embodiment is structured so as to input the next data after the free space of the channel buffer 101 is available. In the present embodiment, the data is inputted into the data multiplexing apparatus 1 on a block-by-block basis. One block shall be 128 Kbytes. In other words, the address control unit 102 controls the addresses of the channel buffer 101 so that the multiplexed blocks are not overwritten for a predetermined period of time by the next-inputted packet stream.

Figure 10:
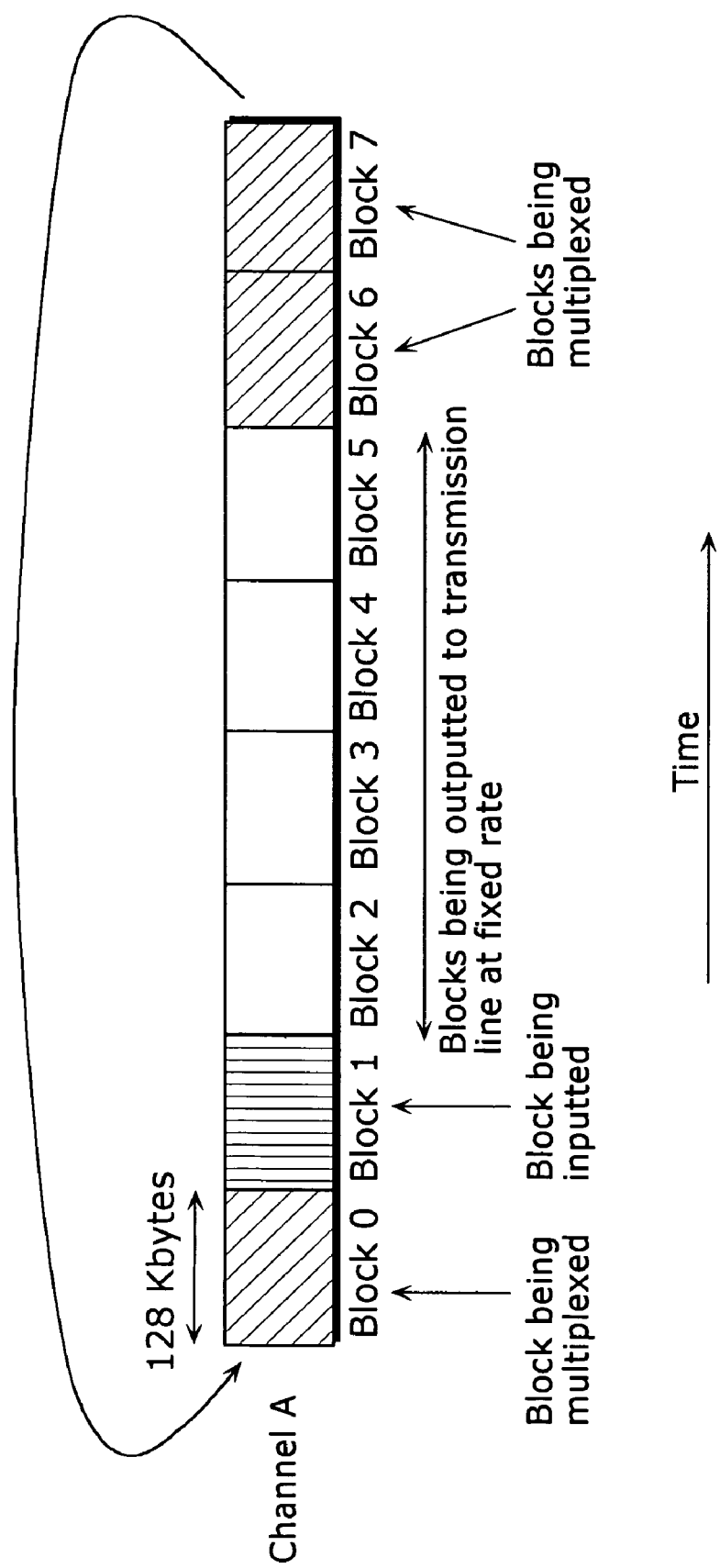
FIG. 10 is a conceptual diagram showing one example of a channel buffer 101 in the present embodiment.

FIG. 10 is a conceptual diagram showing one example of the channel buffer 101 in the present embodiment.

FIG. 10 shows the structure of the buffer for one channel among the buffers for multiple channels in the channel buffer 101. In the present embodiment, the data is inputted into the channel buffer in every block of 128 Kbytes. The buffer for one channel has 8 blocks, which are divided into three types of states. The first type is a block which is being inputted, the second type of blocks are blocks which are being multiplexed, and the third type of blocks are blocks which are being outputted to a transmission channel at a fixed rate of 38.1 Mbps.

Only one block to which the data is being inputted appears in every 100 ms. Since one block is 128 Kbytes (1 Mbit), the data multiplexing apparatus 1 in the present embodiment can support the input rate of data up to 10 Mbps for MPEG2-TS in each channel. Since the data amount of one block or less is inputted into each block (128 Kbytes) in every 100 ms, each block includes, as a result, the data for at least 100 ms.

The blocks which are being multiplexed require the space for at least one block because the multiplexing is performed every 100 ms. In the present embodiment, the space for three blocks is allocated.

The blocks which are being outputted to the transmission line at the fixed rate of 38.1 Mbps require the space for at least four blocks. The number of packets to be stored in the multiplexing order storage unit 104 is controlled using the flags generated by the flag generation unit 105 for jitter absorption.

The maximum number of packets which can be stored in the multiplexing order storage unit 104 is 8192 (for about 323 ms), it takes 323 ms at maximum from the multiplexing of the data up to the output thereof to the transmission line. In other words, the channel buffer 101 needs to hold the data for 323 ms at most after the multiplexing. It needs to hold the data for four blocks because one block includes the data for 100 ms or more. By doing so, it can be avoided that the multiplexed blocks are overwritten by the next-inputted packet streams.

As described above, in the data multiplexing apparatus 1, delay occurs during a time period from inputting of the packet streams into the channel buffer 101 until the output thereof through multiplexing processing.

In the present embodiment, delay of at least 100 ms occurs during multiplexing processing because the data is multiplexed in every 100 ms. In addition, delay of about 100 to 200 ms occurs due to jitter absorption in the multiplexing order storage unit 104. As a result, delay of 300 ms or so occurs in the data multiplexing apparatus 1.

Since there is no particular problem in a case of on-demand viewing of a video signal and an audio signal because delay of 300 ms or so occurs only when the viewing starts. However, in a case of a private data signal, delay of 300 ms occurs every time the data is transmitted or received, which causes a problem.

Particularly in a case where private data is distributed by storing, into the private data signal, IP packet stream including the Internet information, it becomes a problem if delay of 300 ms occurs on every transmission or reception of data (i.e., on every interaction of a user). Therefore, it is preferable to restrain the delay of the private data signal in the data multiplexing apparatus within dozens of ms.

So, in the present embodiment, the private data packet stream is multiplexed in another multiplexing method than the method for a packet stream of a video or audio signal.

Differently from the packet stream of a video or audio signal, as for the packet stream of private data, the time-base information does not need to be rewritten. In other words, it is possible to solve the delay which occurs in a video or audio signal in every 100 ms during multiplexing processing.

In addition, the private data does not require time-base information, the private data packets may be multiplexed and placed in anywhere in a single multiplexed packet stream.

Since null packets, in addition to video and audio packets, are inserted from place to place into a single multiplexed packet stream in order to keep an output transmission rate constant. The null packets, which are inserted only for keeping the transmission rate constant, are removed from the stream when the audio and video are decoded for viewing on the receiving end.

In other words, it is possible to replace the inserted null packets with the private data packets for output and transmission.

For the above-mentioned reason, if the data multiplexing apparatus 1 replaces the null packets with the private data packets for output immediately after they are inputted into the channel buffer 101 thereof, the delay in the data multiplexing apparatus 1 can be minimized, unlike the video and audio packet stream.

The explanation of FIG. 8 will continue as follows.

The packet number obtainment unit 109 obtains the total number of packets included in one block from the local CPU 108 so the private data packets inputted into the channel buffer 101 are outputted in every block at a time.

Since one block is 128 Kbytes in the present embodiment, a maximum of 696 private data TS packets are stored in each block, except for the header information of each block (224 bytes). In other words, the packet number obtainment unit 109 obtains 696, as the number of output packets, at a maximum. The private data is multiplexed for output in every number of packets obtained by the packet number obtainment unit 109.

The address obtainment unit 110 obtains the starting address of the starting packet in the block from the local CPU 108 in order to output the private data for one block at a time. The private data packets equivalent to the number obtained by the packet number obtainment unit 109 are multiplexed for output in sequence from the data at the obtained address.

Obtainment of the starting address by the address obtainment unit 110 triggers the start of the multiplexing and outputting processing. Usually, immediately after the obtainment of the starting address, the multiplexing of the private data packet stream starts.

The null packet detection unit 111 detects the null packets when the packets are outputted from the packet output unit 107 according to the order stored from the channel buffer 101 into the multiplexing order storage unit 104.

A 13-bit PID for identifying a packet is included in a TS packet, and the PID for a null packet is determined as 0x1FFF. The null packet detection unit 111 detects the null packets by comparing the PID value of each packet with the value of 0x1FFF when the packet output unit 107 outputs the packets.

The packet replacements subunit 112 replaces the multiplexed null packets detected by the null packet detection unit 111 with the private data packets for output before the packets are outputted from the data multiplexing apparatus 1 according to the order stored in the multiplexing order storage unit 104.

Following is the explanation of the operations executed by the data multiplexing apparatus 1 structured as mentioned above for multiplexing the private data packets in the multiplexed packet stream of multi-channel video and audio data. It is assumed here that 4-channel data streams as shown in FIG. 9A are inputted into the data multiplexing apparatus 1, and the packet streams of video and audio data in the channels A, B and C are multiplexed first, and then outputted by the packet output unit 107 from the channel buffer 101.

Figure 11:
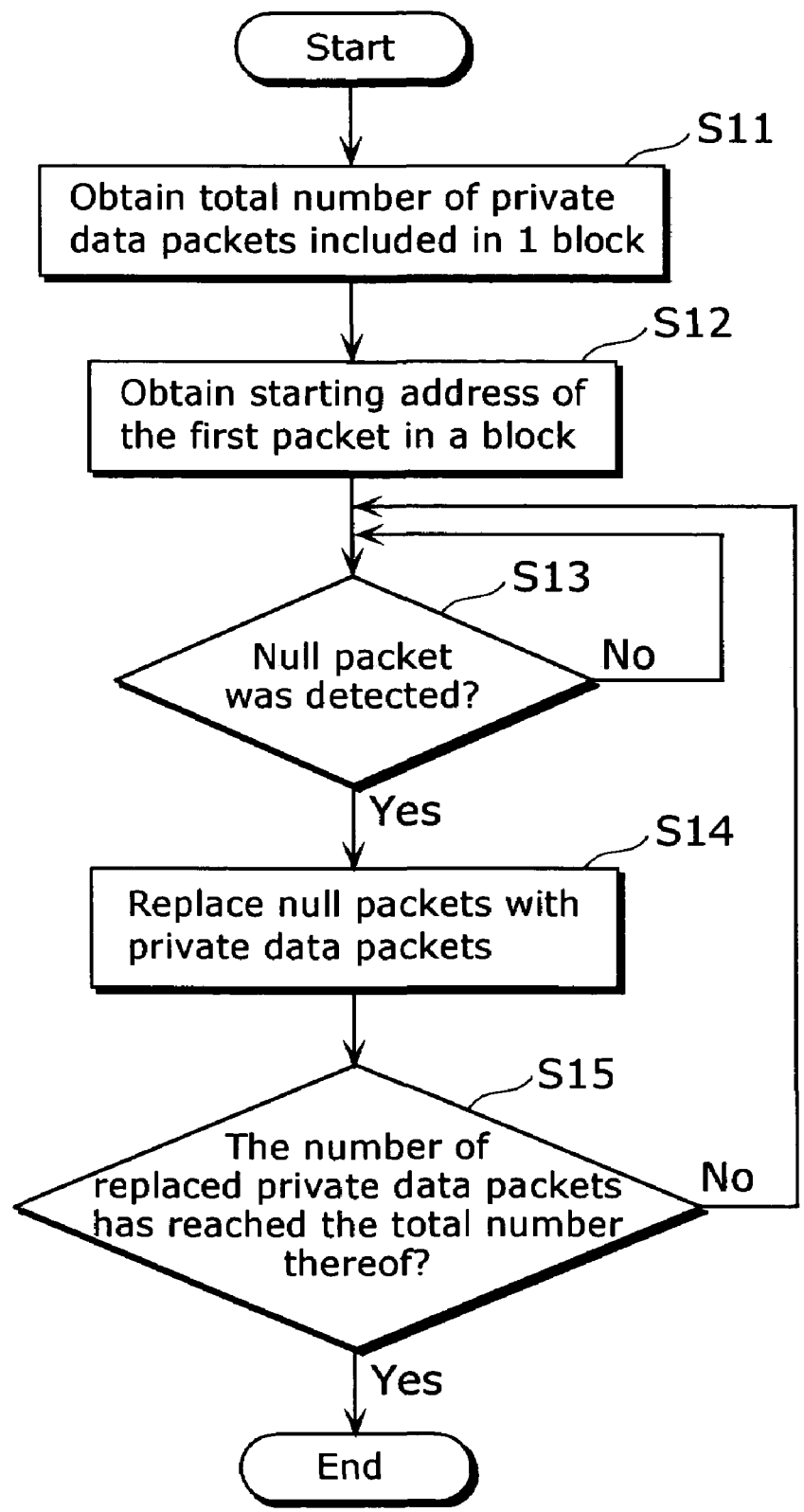
FIG. 11 is a flowchart showing operations for multiplexing packets of private data.

FIG. 11 is a flowchart showing the operations executed when the private data packet stream is multiplexed, FIG. 12A is a conceptual diagram showing a multiplexed packet stream before replacement of packets, and FIG. 12B is a conceptual diagram showing a multiplexed packet stream after replacement of packets.

The packet number obtainment unit 109 obtains the total number of packets included in one block from the local CPU 108 so that the private data packet stream inputted into the channel buffer 101 is outputted in each block at a time (Step S11).

Next, the address obtainment unit 110 obtains the starting address of the starting packet in each block from the local CPU 108 so that the private data for one block is outputted at a time (Step S12). The private data packets equivalent to the number obtained by the packet number obtainment unit 109 are multiplexed in sequence from the packet at the stored address.

Immediately after the address obtainment unit 110 obtains the starting address of the first private data packet in each block, the packet replacements subunit 112 starts replacing the null packets with the private data packets. The total number of private data packets to be replaced from the null packets are obtained by the packet number obtainment unit 109.

When the packets are outputted by the packet output unit 107, according to the stored order, from the channel buffer 101 into the multiplexing order storage unit 104, the null packet detection unit 111 detects whether the outputted packets are null packets or not (Step S13).

Next, when the null packet detection unit 111 detects the null packets (YES in Step S13), the packet replacements subunit 112 replaces, with the private data packets, the detected multiplexed null packets on the packet stream as shown in FIG. 12A inputted from the channel buffer 101, and outputs the packet stream as shown in FIG. 12B (Step S14).

The packet replacements subunit 112 judges whether or not the total number of private data packets which are replaced from the null packets matches the value obtained by the packet number obtainment unit 109 (Step S15). When they match each other as a result of the judgment (YES in Step S15), the multiplexing and output of the private data packets included in the block is completed.

Next, the processing goes to the multiplexing and output of private data packets in the following block. The private data packets in the following block are multiplexed and outputted in the same manner as mentioned above.

As described above, according to the present embodiment, the packet number obtainment unit 109 obtains the number of packets so as to output the private data packets in one block at a time, the multiplexing and output of the private data packet stream is started immediately after the address obtainment unit 110 obtains the starting address, the null packet detection unit 111 detects whether the outputted packets are null packets or not, and the packet replacement subunit 112 replaces the detected multiplexed null packets with the private data packets for output and transmission of the packet stream. As a result, the delay of the packet stream of the private data signal in the data multiplexing apparatus 1 can be restricted to dozens of ms.

In summary, the following operations are performed in the present embodiment, as described above: when the inputted multi-channel packet streams are stored in the channel buffer and multiplexed so as to be outputted as a multiplexed packet stream, the multiplexing order is generated in every predetermined time period; the total number of packets to be multiplexed in every predetermined time period is controlled using flags indicating the state how the packets are stored in the memory which stores the multiplexing order; the addresses in the channel buffer are controlled in every predetermined block; the addresses in the channel buffer are controlled so that the multiplexed blocks are not overwritten by the next-inputted packet stream for a predetermined time period; the total number of packets is set so that the private data packets in one block are outputted at a time; the multiplexing of the private data packets is started immediately after the starting address of the private data is written; it is detected whether the outputted packets are null packets or not; and the detected multiplexed null packets are replaced by the private data packets for output and transmission of the multiplexed packet stream. As a result, it is possible to input and multiplex the data, and output the multiplexed data at the transmission rate which is compliant with the standard of the transmission line, without using the output buffer but using only the channel buffer, and further to restrain the delay of the packet stream of the private data signal in the data multiplexing apparatus 1 within dozens of ms.

From the invention thus described, it will be obvious that the embodiment of the present invention may be varied in many ways. Such variations are not to be regarded as a departure from the spirit and scope of the invention, and all such modifications as would be obvious to one skilled in the art are intended for inclusion within the scope of the following claims.

The data multiplexing apparatus to which the present invention can be applied is not limited to the data multiplexing apparatus for multiplexing MPEG2-TS packet streams, nor the data multiplexing apparatus for multiplexing a video signal and an audio signal. The present invention can be applied to the data multiplexing apparatus or the data multiplexing method for multiplexing arbitrary digital data and outputting the multiplexed data at the transmission rate which is compliant with the standard of the transmission line, using only one storage unit.

Particularly, the present invention is effective for the data multiplexing apparatus or the data multiplexing method for multiplexing a video signal, an audio signal, a private data signal or any other continuous digital data. That is why the transmission efficiency of these types of data needs to be increased as much as possible because they often need to be transmitted in large volume at high speed close to the maximum output rate or the maximum input rate of the memory.

In addition, since the inconvenience of a video or audio interruption occurs when the buffer of the reception apparatus that is the end terminal of data transmission (such as a television or a stereo set) becomes empty of the digital data, it is required at the end terminal to maintain continuity of a signal in the time domain, and thus the delay of a predetermined or longer time period in data transmission is not allowed. Therefore, it is necessary to minimize the delay in transmission of data like a video signal in the data multiplexing apparatus or the like so as to realize the system with higher efficiency of data transmission. Under these circumstances, the present invention has a dramatic effect when it is applied to the data multiplexing apparatus or the data multiplexing method for multiplexing a video signal, an audio signal, a private data signal or any other digital data.

Furthermore, the null packets are replaced by the private data packets in the present embodiment, but they may be replaced by other types of packets. To be more specific, the data multiplexing apparatus which has been explained in the present embodiment is a data multiplexing apparatus for multiplexing a plurality of packet streams and outputting a multiplexed packet stream, comprising: a data multiplexing unit operable to generate a first multiplexed packet stream by multiplexing at least one first packet stream and null packets so that the multiplexed packet stream is outputted at a predetermined transmission rate, said null packets being inserted into said first multiplexed packet stream; and a packet replacement unit operable to generate the multiplexed packet stream by replacing the inserted null packets with packets that constitute a second packet stream. Note that it is also possible to realize the present invention as a data multiplexing method including the steps executed by the characteristic units included in the above-mentioned data multiplexing apparatus. In addition, it is preferable that the second packet stream in this data multiplexing apparatus or the like is made up of data having no time-base information, as mentioned above.

Second Embodiment

Figure 13:
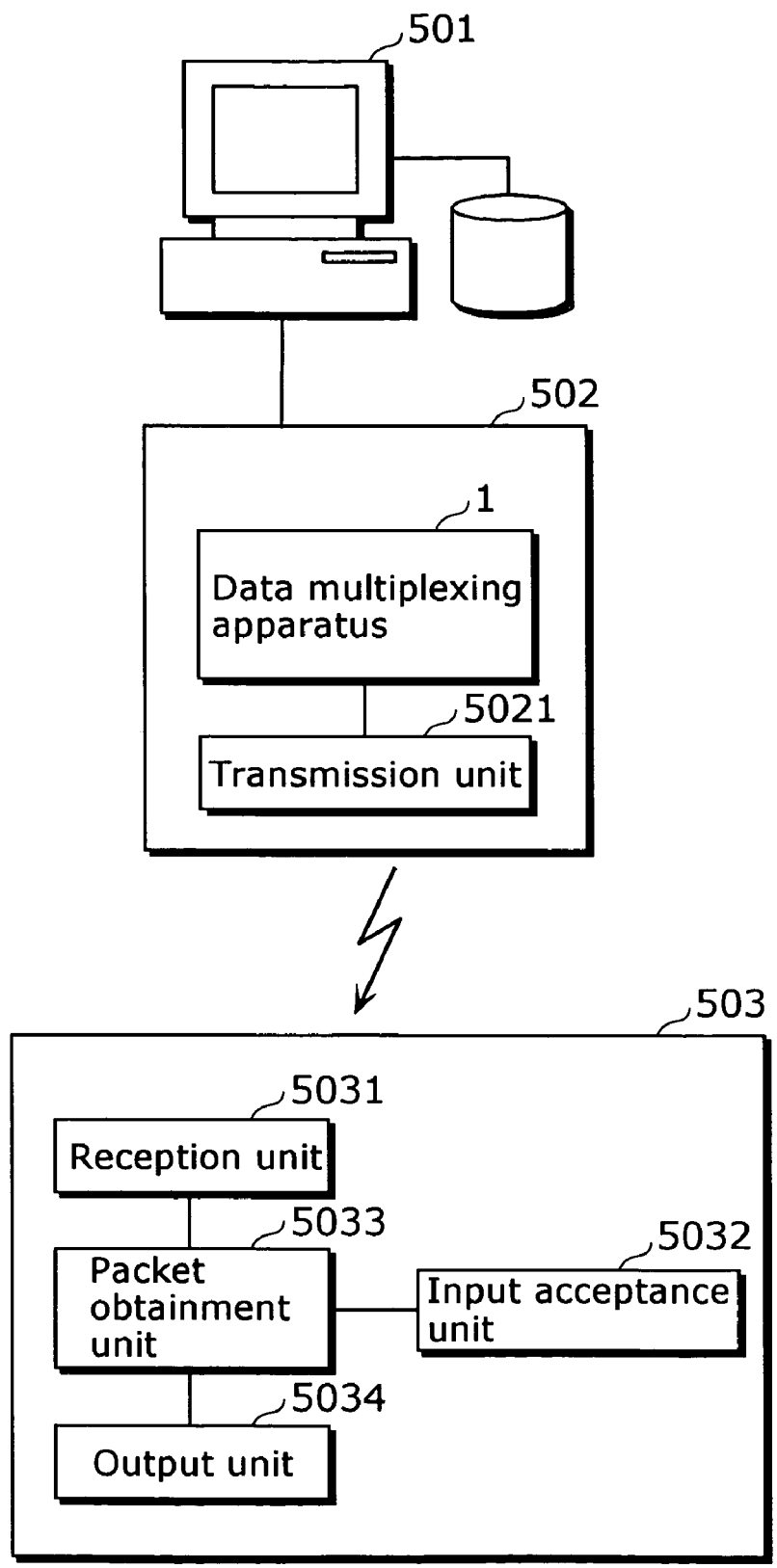
FIG. 13 is a block diagram showing a structure of a transmission and reception system according to a second embodiment of the present invention.

FIG. 13 is a block diagram showing the structure of the transmission and reception system according to the second embodiment of the present invention. This transmission and reception system includes a server apparatus 501, a transmission apparatus 502 and a reception apparatus 503.

The server apparatus 501 stores multi-channel contents to be transmitted, and supplies the transmission apparatus 502 with the contents.

The transmission apparatus 502 has the data multiplexing apparatus 1 and a transmission unit 5021. The data multiplexing apparatus 1 obtains a content (a packet stream) per channel from the server apparatus 501. Since the data multiplexing apparatus 1 has been explained in detail in the first embodiment, the explanation thereof is not repeated here.

The transmission unit 5021 transmits a multiplexed stream outputted from the data multiplexing apparatus 1. It is preferable to realize the transmission unit 5021 by broadcasting, but it can be realized by wired or wireless communication.

The reception apparatus 503 receives the stream sent from the transmission apparatus 502 and outputs it. The reception apparatus 503 includes a reception unit 5031, an input acceptance unit 503, a packet obtainment unit 5033 and an output unit 5034.

The reception unit 5031 receives the stream from the transmission apparatus 502. It is preferable to realize the reception unit 5031 by receiving broadcast, but it can be realized by receiving wired or wireless communication.

The input acceptance unit 5032 accepts an input (a remote control signal, for example) from a user. The input acceptance unit 5032 can be realized by an infrared reception unit and a driver software for remote control or the like.

The packet obtainment unit 5033 obtains the packets in the stream received by the reception unit 5031 when the input acceptance unit 5032 accepts the input thereof. When the input acceptance unit 5032 accepts a signal indicating the channel "6", for example, the packet obtainment unit 5033 obtains the packets of the program corresponding to the channel "6".

The output unit 5034 outputs the packets obtained by the packet obtainment unit 5033. "Output" usually means display on a screen or the like and sound output to a speaker, but may include transmission or the like to an external apparatus. The output unit 5034 may include or need not include an output device such as a display and a speaker. The output unit 5034 can be realized by a driver software for the output device, or the driver software for the output device and the output device, or the like.

In the present transmission and reception system, the contents stored in the server apparatus 501 are multiplexed and transmitted by the transmission apparatus 502. The reception apparatus 503 receives and outputs the contents. In this case, as mentioned in the first embodiment, the transmission apparatus 502 multiplexes contents (packet streams) of multiple channels using the data multiplexing method for replacing the null packets generated as a result of multiplexing of the first packet streams of one or more channels, with the packets that constitute the second packet stream and outputting a single multiplexed stream.

In the present embodiment, it has been explained how the multiplexing apparatus in the first embodiment transmits and receives contents (packet streams).

What is claimed is:

1. A data multiplexing apparatus for multiplexing a plurality of packet streams and outputting a multiplexed packet stream, the data multiplexing apparatus comprising:

a data multiplexing unit operable to generate a first stream by multiplexing at least one first packet stream and a plurality of null packets by combining the at least one first packet stream with an appropriate number of the null packets so that the first stream is outputted at a predetermined transmission rate;

a packet stream storage unit including locations for storing a second packet stream, the second packet stream including predetermined blocks of packets, each predetermined block including a starting packet; and a packet replacement unit operable to generate the multiplexed packet stream by replacing at least some of the null packets of the first stream with packets of the second packet stream, wherein the data multiplexing unit includes:

a channel buffer operable to multiplex the at least one first packet stream and the null packets and store the multiplexed packet stream as the first stream;

a multiplexing order generation unit operable to generate order information indicating an order of packets to be multiplexed to form the first stream, for every cycle of a predetermined period of time;

a multiplexing order storage unit operable to store the order information;

a flag generation unit operable to generate a flag indicating a state of how the order information is stored in the multiplexing order storage unit; and a multiplexing total number control unit operable to determine a total number of packets to be multiplexed for every cycle of the predetermined period of time, based on the flag generated by the flag generation unit and operable to control the multiplexing order generation unit based on the determined total number of packets, wherein the multiplexing order generation unit is operable to generate the order information so that a sum of a number of the null packets and a number of the packets of the first packet stream multiplexed for every cycle of the predetermined period of time is equal to the determined total number of packets, wherein the data multiplexing unit is operable to output the first stream at the predetermined transmission rate through multiplexing by the channel buffer, of the at least one first packet stream and the null packets based on the order information generated by the multiplexing order generating unit, and wherein the packet replacement unit includes:

an address obtaining subunit operable to obtain an address, in the packet stream storage unit, for each location at which the starting packets of the predetermined blocks of packets are stored;

a null packet detection subunit operable to detect the null packets within the first stream;

a packet number obtaining subunit operable to obtain a number of packets for each predetermined block of packets of the second packet stream; and a packet replacement subunit operable to generate the multiplexed packet stream by replacing at least some of the null packets detected by the null packet detection subunit with the packets of at least one of the predetermined blocks of the second packet stream, in sequence, and starting from the starting packet at the address obtained by the address obtaining subunit, a number of packets replacing the null packets being equivalent to the number of packets of the predetermined block obtained by the packet number obtaining subunit.

2. The data multiplexing apparatus according to claim 1, wherein the number of packets for each predetermined block obtained by the packet number obtaining subunit is equal to or less than a total number of packets included in each predetermined block of the second packet stream stored in the packet stream storage unit.

3. The data multiplexing apparatus according to claim 1, wherein the packet replacement subunit starts replacing the null packets when the address obtaining subunit obtains an address of a starting packet of one of the predetermined blocks.

4. The data multiplexing apparatus according to claim 1, wherein the flag generated by the flag generation unit includes a first flag and a second flag, the first flag indicating that a number of stored packets is equal to or less than a first predetermined value, the second flag indicating that the number of stored packets is equal to or more than a second predetermined value.

5. The data multiplexing apparatus according to claim 1, wherein the second packet stream comprises data having no time-base information.

6. The data multiplexing apparatus according to claim 5, wherein the second packet stream is a packet stream of private data.

7. The data multiplexing apparatus according to claim 1, wherein the first packet stream is a packet stream including at least one of a video signal and an audio signal.

8. The data multiplexing apparatus according to claim 1, wherein the packet stream storage unit is a synchronous dynamic RAM.

9. A transmission apparatus for multiplexing a plurality of packet streams and transmitting a multiplexed packet stream, the transmission apparatus comprising:

a data multiplexing unit operable to generate a first stream by multiplexing at least one first packet stream and a plurality of null packets by combining the at least one first packet stream with an appropriate number of the null packets so that the first stream is outputted at a predetermined transmission rate;

a packet stream storage unit including locations for storing a second packet stream, the second packet stream including predetermined blocks of packets, each predetermined block including a starting packet;

a packet replacement unit operable to generate the multiplexed packet stream by replacing at least some of the null packets of the first stream with packets of the second packet stream; and a transmission unit operable to transmit the multiplexed packet stream generated by the packet replacement unit, wherein the data multiplexing unit includes:

a channel buffer operable to multiplex the at least one first packet stream and the null packets and store the multiplexed packet stream as the first stream;

a multiplexing order generation unit operable to generate order information indicating an order of packets to be multiplexed to form the first stream, for every cycle of a predetermined period of time;

a multiplexing order storage unit operable to store the order information;

a flag generation unit operable to generate a flag indicating a state of how the order information is stored in the multiplexing order storage unit; and a multiplexing total number control unit operable to determine a total number of packets to be multiplexed for every cycle of the predetermined period of time, based on the flag generated by the flag generation unit and operable to control the multiplexing order generation unit based on the determined total number of packets, wherein the multiplexing order generation unit is operable to generate the order information so that a sum of a number of the null packets and a number of the packets of the first packet stream multiplexed for every cycle of the predetermined period of time is equal to the determined total number of packets, wherein the data multiplexing unit is operable to output the first stream at the predetermined transmission rate through multiplexing, by the channel buffer, of the at least one first packet stream and the null packets based on the order information generated by the multiplexing order generation unit, and wherein the packet replacement unit includes:
an address obtaining subunit operable to obtain an address, in the packet stream storage unit, for each location at which the starting packets of the predetermined blocks of packets are stored;
a null packet detection subunit operable to detect the null packets within the first stream;
a packet number obtaining subunit operable to obtain a number of packets for each predetermined block of packets of the second packet stream; and
a packet replacement subunit operable to generate the multiplexed packet stream by replacing at least some of the null packets detected by the null packet detection subunit with the packets of at least one of the predetermined blocks of the second packet stream, in sequence, and starting from the starting packet at the address obtained by the address obtaining subunit, a number of packets replacing the null packets being equivalent to the number of packets of the predetermined block obtained by the packet number obtaining subunit.

10. A data multiplexing method for using a data multiplexing apparatus for multiplexing a plurality of packet streams and outputting a multiplexed packet stream, the data multiplexing apparatus including a packet stream storage unit including locations for storing a second packet stream, the second packet stream including predetermined blocks of packets, each predetermined block including a starting packet, the data multiplexing method comprising:

generating a first stream by multiplexing at least one first packet stream and a plurality of null packets by combining the at least one first packet stream with an appropriate number of the null packets so that the first stream is outputted at a predetermined transmission rate; and generating the multiplexed packet stream by replacing at least some of the null packets of the first stream with packets of the second packet stream, wherein said generating of the first stream includes:
multiplexing the at least one first packet stream and the null packets and storing the multiplexed packet stream as the first stream;
generating order information indicating an order of packets to be multiplexed to form the first stream, for every cycle of a predetermined period of time;
storing the order information;
generating a flag indicating a state of how the order information is stored; and
determining a total number of packets to be multiplexed for every cycle of the predetermined period of time, based on the flag generated by said generating of the flag, and controlling said generating of the order information based on the determined total number of packets, wherein said generating of the order information includes generating the order information so that a sum of a number of the null packets and a number of the packets of the first packet stream multiplexed for every cycle of the predetermined period of time is equal to the determined total number of packets, wherein said generating of the first stream includes outputting the first stream at the predetermined transmission rate through multiplexing by said multiplexing of the at least one first packet stream and the null packets based on the order information, and wherein said generating of the multiplexed packet stream further includes:
obtaining an address, in the packet stream storage unit, for each location at which the starting packets of the predetermined blocks of packets are stored;
detecting the null packets within the first stream;
obtaining a number of packets for each predetermined block of packets of the second packet stream; and
generating the multiplexed packet stream by replacing at least some of the null packets, detected by said detecting of the null packets, with the packets of at least one of the predetermined blocks of the second packet stream, in sequence, and starting from the starting packet at the address obtained by said obtaining of the address, a number of packets replacing the null packets being equivalent to the number of packets of the predetermined block obtained by said obtaining of the number of packets.

11. A computer program recorded on a computer-readable recording medium, the computer program for using a data multiplexing apparatus for multiplexing a plurality of packet streams and outputting a multiplexed packet stream, the data multiplexing apparatus including a packet stream storage unit including locations for storing a second packet stream, the second packet stream including predetermined blocks of packets, each predetermined block including a starting packet, the computer program causing the data multiplexing apparatus to execute a method comprising:

generating a first stream by multiplexing at least one first packet stream and a plurality of null packets by combining the at least one first packet stream with an appropriate number of the null packets so that the first stream is outputted at a predetermined transmission rate; and generating the multiplexed packet stream by replacing at least some of the null packets of the first stream with packets of the second packet stream, wherein said generating of the first stream includes:
multiplexing the at least one first packet stream and the null packets and storing the multiplexed packet stream as the first stream;
generating order information indicating an order of packets to be multiplexed to form the first stream, for every cycle of a predetermined period of time;
storing the order information;
generating a flag indicating a state of how the order information is stored; and
determining a total number of packets to be multiplexed for every cycle of the predetermined period of time, based on the flag generated by said generating of the flag, and controlling said generating of the order information based on the determined total number of packets, wherein said generating of the order information includes
generating the order information so that a sum of a
number of the null packets and a number of the packets
of the first packet stream multiplexed for every cycle of
the predetermined period of time is equal to the determined total number of packets, wherein said generating of the first stream includes outputting the first stream at the predetermined transmission rate through multiplexing by said multiplexing of the at least one first packet stream and the null packets based on the order information, and wherein said generating of the multiplexed packet stream further includes:
- obtaining an address, in the packet stream storage unit, for each location at which the starting packets of the predetermined blocks of packets are stored;
- detecting the null packets within the first stream;
- obtaining a number of packets for each predetermined block of packets of the second packet stream; and
- generating the multiplexed packet stream by replacing at least some of the null packets, detected by said detecting of the null packets, with the packets of at least one of the predetermined blocks of the second packet stream, in sequence, and starting from the starting packet at the address obtained by said obtaining of the address, a number of packets replacing the null packets being equivalent to the number of packets of the predetermined block obtained by said obtaining of the number of packets.

* * * * *